(12) United States Patent
Sugawara et al.

(10) Patent No.: US 12,486,423 B2
(45) Date of Patent: Dec. 2, 2025

(54) COMPOSITION FOR AQUEOUS COATING LIQUID

(71) Applicant: SHOWA DENKO K.K., Tokyo (JP)

(72) Inventors: Atsushi Sugawara, Tokyo (JP); Jun Konishi, Tokyo (JP)

(73) Assignee: Resonac Corporation, Tokyo (JP)

( * ) Notice: Subject to any disclaimer, the term of this patent is extended or adjusted under 35 U.S.C. 154(b) by 440 days.

(21) Appl. No.: 17/612,006

(22) PCT Filed: May 18, 2020

(86) PCT No.: PCT/JP2020/019577
§ 371 (c)(1),
(2) Date: Nov. 17, 2021

(87) PCT Pub. No.: WO2020/235515
PCT Pub. Date: Nov. 26, 2020

(65) Prior Publication Data
US 2022/0228018 A1     Jul. 21, 2022

(30) Foreign Application Priority Data

May 20, 2019   (JP) ................................. 2019-094235

(51) Int. Cl.
| | |
|---|---|
| *C09D 133/02* | (2006.01) |
| *C08F 220/06* | (2006.01) |
| *C08F 220/54* | (2006.01) |
| *C08K 3/22* | (2006.01) |
| *C09D 7/61* | (2018.01) |
| *C09D 133/24* | (2006.01) |

(52) U.S. Cl.
CPC .......... *C09D 133/02* (2013.01); *C08F 220/06* (2013.01); *C08F 220/54* (2013.01); *C08K 3/22* (2013.01); *C09D 7/61* (2018.01); *C09D 133/24* (2013.01); *C08K 2003/2227* (2013.01)

(58) Field of Classification Search
CPC ...... C09D 133/02; C09D 133/24; C09D 7/61; C08F 220/06; C08F 220/54; C08K 2003/2227; C08K 3/22
USPC .......................................................... 524/5
See application file for complete search history.

(56) References Cited

U.S. PATENT DOCUMENTS

| | | |
|---|---|---|
| 10,626,558 B2 | 4/2020 | Esser et al. |
| 2003/0092812 A1 | 5/2003 | Nakada et al. |
| 2018/0216294 A1 | 8/2018 | Esser et al. |

FOREIGN PATENT DOCUMENTS

| | | | |
|---|---|---|---|
| JP | 07-097317 A | | 4/1995 |
| JP | 2000-302817 A | | 10/2000 |
| JP | 2002-241747 A | | 8/2002 |
| JP | 2004277384 A | * | 10/2004 |
| JP | 5005137 B2 | | 8/2012 |
| JP | 2018-523764 A | | 8/2018 |
| KR | 20180074616 A | * | 7/2018 |
| TW | 201710308 A | | 3/2017 |
| WO | 01/053427 A1 | | 7/2001 |
| WO | WO 2015/046126 A1 | * | 4/2015 |
| WO | 2016/181993 A1 | | 11/2016 |

OTHER PUBLICATIONS

Translation of WO 2015/046126, Apr. 2, 2015. (Year: 2015).*
International Search Report dated Jun. 23, 2020 from the International Searching Authority in International Application No. PCT/JP2020/019577.
Written Opinion dated Jun. 23, 2020 from the International Searching Authority in International Application No. PCT/JP2020/019577.
Office Action dated Dec. 25, 2020 from the Taiwan Intellectual Property Office in TW Application No. 109116503.

* cited by examiner

*Primary Examiner* — Tae H Yoon
(74) *Attorney, Agent, or Firm* — Sughrue Mion, PLLC

(57) ABSTRACT

To provide an aqueous composition for aqueous coating that contains a polymerized substance of a N-vinyl carboxylic acid amide and that dries efficiently when used to produce a coating substance. A composition for aqueous coating liquid, comprising at least a copolymer of a N-vinyl carboxylic acid amide monomer and a monomer of a salt of an unsaturated carboxylic acid, and water, in which the molar ratio between the N-vinyl carboxylic acid amide monomer and the monomer of a salt of an unsaturated carboxylic acid is 7.0:93.0 to 93.0:7.0, and the weight-average molecular weight of the copolymer is 15,000 to 2,500,000.

19 Claims, No Drawings

COMPOSITION FOR AQUEOUS COATING LIQUID

CROSS REFERENCE TO RELATED APPLICATIONS

This application is a National Stage of International Application No. PCT/JP2020/019577, filed May 18, 2020, claiming priority to Japanese Patent Application No. 2019-094235, filed May 20, 2019.

TECHNICAL FIELD

The present invention relates to a composition containing a copolymer of a N-vinyl carboxylic acid amide monomer and a monomer of a salt of an unsaturated carboxylic acid as a water-soluble high polymer, and water, and relates mainly to a composition with which an easily drying coating substance can be formed on an application surface in the field of coating liquids such as coating materials, inks, adhesives, and positive electrodes, negative electrodes, and separators of lithium-ion batteries containing water-soluble high polymers.

BACKGROUND ART

In the entire industrial field, coating and printing techniques using water-soluble high polymers are beginning to become widely used from the viewpoints of environment and safety, as well as efficiency. In particular, when reducing the film thickness, a water-based coating liquid using a water-soluble high polymer is quite excellent, and has an enormous industrial advantage.

Among them, a homopolymer or a copolymer of N-vinylacetamide, which is a kind of polymer of a N-vinyl carboxylic acid amide monomer, has amphiphilicity and can be easily increased in molecular weight and viscosity, and is therefore used for various uses such as water-based inks and coating materials, thickening of various water-based blended coating liquids, film-making, and adhesives. In particular, the polymer is used as adhesives, coating materials, building materials, and binder resins for secondary batteries in personal care fields such as medicines and cosmetics, construction fields such as building materials, and industrial fields.

However, in the case where for example a water-soluble high polymer such as a polymer of a N-vinyl carboxylic acid amide monomer is dissolved in water as solvent and is used, the drying efficiency is often very poor as compared to the case where an organic solvent is used as resolvent.

In uses of which covering film properties are not expected, there is a case where a non-hydrophilic polymer emulsion or rubber latex is used as a water-based coating liquid; the drying rate is, in comparison, greatly different between these liquids and water-soluble high polymers, and the fact that a water-soluble high polymer takes time for drying has occasionally been a problem. Polymer emulsions and rubber latex have many issues in that a thickening effect cannot be expected as a binder for coating and the coating surface is brittle.

It is generally the case that an improvement in drying efficiency is achieved by improving equipment or optimizing drying conditions.

However, an improvement of equipment often involves huge expenses. Moreover, there are limitations on raising the drying temperature or increasing the drying airflow rate, which are measures to optimize drying conditions, as these greatly affect the covering film, and these also lead to an increase in energy consumption.

In particular, in secondary batteries such as lithium-ion batteries, a reduction in film thickness of coating substances is required from the viewpoints of for example weight reduction and density increase. Thus, an improvement in drying rate of a coating substance containing a water-soluble high polymer is recognized as a necessary technique also from the viewpoint that the direction in which energy consumption in the manufacturing process increases is very unfavorable in view of the consideration for the environment.

Patent Literature 1 below discloses a separator for zinc secondary batteries that is a copolymer of a monomer having a N-vinylamide structure and a monomer having a structure of a carboxylic acid or a salt thereof.

Patent Literature 2 below discloses a composition for cooling that contains polyacrylic acids at 1 to 59.5 mass %, a N-vinylacetamide polymer at 0.1 to 30 mass %, polyvalent metals at 0.05 to 1 mass %, and water at 40 to 80 mass %.

Patent Literature 3 below discloses a copolymer of: a monomer of at least one kind selected from the group consisting of an unsaturated carboxylic acid monomer, a salt of an unsaturated carboxylic acid monomer, an unsaturated carboxylic acid ester monomer, a vinyl ester monomer, and an unsaturated nitrile monomer; and N-vinylacetamide, in which the ratio between the mole number of the constituent units derived from N-vinylacetamide and the mole number of other constituent units such as the unsaturated carboxylic acid monomer is 1.00:0.010 to 1.00:0.250.

CITATION LIST

Patent Literature

Patent Literature 1: JP 5005137 B2
Patent Literature 2: JP 2002-241747 A
Patent Literature 3: WO 2016/181993 A1

Patent Literature 1 shows details concerning a separator for zinc secondary batteries; in Patent Literature 1, although the fabrication process of a battery has a drying step, there is no disclosure or suggestion concerning drying properties or coating properties of the copolymer.

In Patent Literature 2, although there is a description on the adhesive strength of a medical adhesive preparation, there is no disclosure or suggestion concerning drying properties or coating properties.

In Patent Literature 3, although the copolymer is dried after polymerization and is used for a binder, there is no disclosure or suggestion concerning coating properties or drying properties of the aqueous solution.

SUMMARY OF INVENTION

Technical Problem

Although a water-soluble high polymer has good coating properties, the drying time of the water-soluble high polymer is long as compared to that of an organic solvent-based high polymer, and in many cases the modification of drying equipment or the optimization of drying temperature alone cannot cope with the situation. The actual situation is that no constitution whatsoever has been proposed by which drying can be carried out efficiently when producing a coating substance from a water-soluble composition in which a polymer of a N-vinyl carboxylic acid amide monomer is dissolved.

Solution to Problem

Under such circumstances, the present inventors conducted extensive studies, and have found out that an aqueous coating liquid containing, among water-soluble high polymers, a copolymer of a N-vinyl carboxylic acid amide monomer and a monomer of a salt of an unsaturated carboxylic acid has excellent drying properties and can be sufficiently used for the uses mentioned above; thus, have completed the present invention.

That is, the constitution of the present invention is as follows.

[1] A composition for aqueous coating liquid, comprising at least a copolymer of a N-vinyl carboxylic acid amide monomer and a monomer of a salt of an unsaturated carboxylic acid, and water, in which the molar ratio between the N-vinyl carboxylic acid amide monomer and the monomer of a salt of an unsaturated carboxylic acid is 7.0:93.0 to 93.0:7.0, and the weight-average molecular weight of the copolymer is 15,000 to 2,500,000.

[2] The composition for aqueous coating liquid according to [1], in which the Mw/Mn of the copolymer is not less than 1.8.

[3] The composition for aqueous coating liquid according to [1] or [2], further comprising inorganic filler.

[4] The composition for aqueous coating liquid according to any one of [1] to [3], in which the N-vinyl carboxylic acid amide monomer is a N-vinylacetamide monomer.

[5] The composition for aqueous coating liquid according to any one of [1] to [4], in which the viscosity of an aqueous solution with a solid content concentration of the copolymer of 5 mass % is 1,500 to 30,000 mPa·s, and the solid content concentration is 1 to 15 mass %.

[6] The composition for aqueous coating liquid according to any one of [1] to [5], in which the monomer of a salt of an unsaturated carboxylic acid is a salt of (meth)acrylic acid.

[7] The composition for aqueous coating liquid according to any one of [1] to [6], in which the composition for aqueous coating liquid contains the copolymer at 1.0 to 20.0 parts by mass relative to 100 parts by mass of the water.

[8] The composition for aqueous coating liquid according to any one of [3] to [7], in which the inorganic filler is at least one of alumina and boehmite.

[9] The composition for aqueous coating liquid according to any one of [1] to [8], in which the composition for aqueous coating liquid further comprises a N-vinyl carboxylic acid amide homopolymer in addition to a copolymer of a N-vinyl carboxylic acid amide monomer and a monomer of a salt of an unsaturated carboxylic acid.

[10] A method for manufacturing a water-soluble high polymer coating substance, the method comprising applying the composition for aqueous coating liquid according to any one of [1] to [9] to a surface of a base material, and performing drying.

[11] A method for manufacturing the composition for aqueous coating liquid according to any one of [1] to [9], the method comprising performing radical polymerization by using a non-halogen azo-compound-based polymerization initiator.

[12] A method for manufacturing the composition for aqueous coating liquid according to any one of [1] to [9], the method comprising performing polymerization by stirring polymerization.

Advantageous Effects of Invention

A composition for aqueous coating liquid of the present invention exhibits significantly improved drying properties when used for coating.

DESCRIPTION OF EMBODIMENTS

Hereinbelow, the present invention is described specifically. The composition of the present invention is not limited to the following descriptions, as a matter of course.

Composition for Aqueous Coating Liquid

A composition for aqueous coating liquid of the present invention contains at least a copolymer obtained by polymerizing a N-vinyl carboxylic acid amide monomer and a monomer of a salt of an unsaturated carboxylic acid, and water as essential components. As the aqueous coating liquid, adhesives, for example coating materials, inks, positive electrodes, negative electrodes, and separators of lithium-ion batteries, are given. Each component will now be described.

Copolymer

As the copolymer used for the present invention, a copolymer obtained by copolymerizing at least a N-vinyl carboxylic acid amide monomer and a monomer of a salt of an unsaturated carboxylic acid is used.

The N-vinyl carboxylic acid amide monomer is represented by formula (1) below.

[Chem. 1]

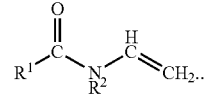

(1)

in which $R^1$ represents a hydrogen atom or a hydrocarbon group having 1 to 6 carbon atoms, and $R^2$ represents a hydrogen atom or a hydrocarbon group having 1 to 6 carbon atoms; $R^1$ optionally forms a ring structure together with $NR^2$; a preferred example of $R^1$ is a hydrogen atom or a methyl group, and a preferred example of $R^2$ is a hydrogen atom.

Specific examples of the N-vinyl carboxylic acid amide monomer include N-vinylformamide, N-vinylacetamide, N-vinylpropionamide, N-vinylbenzamide, N-vinyl-N-methylformamide, N-vinyl-N-ethylformamide, N-vinyl-N-methylacetamide, N-vinyl-N-ethylacetamide, and N-vinylpyrrolidone. Among these, N-vinylacetamide is particularly preferable. It is also possible to use two or more kinds of N-vinyl carboxylic acid amide monomers in combination.

The monomer of a salt of an unsaturated carboxylic acid is not particularly limited, and salts of for example itaconic acid, maleic acid, crotonic acid, and (meth)acrylic acid are given.

Among these, salts of (meth)acrylic acid are preferable; among them, alkali metal salts of acrylic acid and ammonium salts of acrylic acid are preferable. As the alkali metal salt, for example lithium salts, sodium salts, and potassium salts are given. The ammonium salt may be an ammonium salt in which at least one hydrogen atom is substituted with for example an alkyl, and an aryl, but is preferably an ammonium salt. In the present invention, (meth)acrylic acid means acrylic acid and/or methacrylic acid.

It is preferable to remove the polymerization inhibitor of the salt of an unsaturated carboxylic acid. For the salt of an unsaturated carboxylic acid, two or more kinds may be used in combination.

The molar ratio between the N-vinyl carboxylic acid amide monomer and the monomer of a salt of an unsaturated carboxylic acid in the copolymer is 7.0:93.0 to 93.0:7.0, preferably 8.0:92.0 to 60.0:40.0, and more preferably 10.0: 90.0 to 50.0:50.0. By the molar ratio being within the range mentioned above, an aqueous solution copolymer having a viscosity usable as a thickening coating material is obtained.

The copolymer of the present invention may contain a monomer other than the N-vinyl carboxylic acid amide monomer or the salt of an unsaturated carboxylic acid.

As the monomer other than the N-vinyl carboxylic acid amide monomer or the salt of an unsaturated carboxylic acid, for example unsaturated carboxylic acid esters, unsaturated carboxylic acid amides, and styrene-based monomers are preferable. These monomers account for preferably not more than 30 mol %, more preferably not more than 20 mol %, and still more preferably not more than 10 mol % relative to the sum total of N-vinyl carboxylic acid amides, acrylic acid, and salts of acrylic acid. When these monomers account for not more than 30 mol %, a polymer with high viscosity can be obtained; thus, this is preferable.

Method for Manufacturing the Copolymer:

As the polymerization type, solution polymerization or drop polymerization may be used, and radical polymerization in an aqueous solution that uses a water-soluble radical polymerization initiator and that uses a water medium, which has low chain transfer action, is suitable.

When having the intention of obtaining a high viscosity article, a bulk polymerization method in which polymerization is advanced in a state where each of the monomers are mixed in an aqueous solution is preferable; when having the intention of obtaining a middle-to-low viscosity article, a drop polymerization method in which all of, or one of the monomer species is dropped is preferable. Here, high viscosity refers to a composition in which the viscosity in an aqueous solution with a solid content concentration of 5 mass % is not less than 10000 mPa·s, middle viscosity refers to a composition in which the viscosity of an aqueous solution with a solid content concentration of 5 mass % is not less than 2000 mPa·s and less than 10000 mPa·s, and low viscosity refers to a composition in which the viscosity of an aqueous solution with a solid content concentration of 5 mass % is not less than 10 mPa·s and less than 2000 mPa·s.

The viscosity of the copolymer favorable to the present invention is 1500 to 30000 mPa·s, preferably 2000 to 25000 mPa·s, and more preferably 3000 to 18000 mPa·s when it is measured with an aqueous solution with a solid content concentration of 5 mass %.

When the viscosity of the copolymer is within this range, the state of the coating substance is good, and furthermore a great advantage is also provided in productivity because an effect of appropriately extending the coating liquid is obtained and this makes it easy to coat a large coating area per unit time and also yields a high drying rate.

The weight-average molecular weight (Mw) of the copolymer of the present invention is 15,000 to 2,500,000, preferably 20,000 to 2,000,000, and more preferably 100,000 to 1,500,000. When the Mw of the copolymer is not less than 15,000, the molecular weight is appropriate and a favorable thickening action and a favorable extending effect are obtained, and hence a uniform thin film can be produced, and furthermore drying properties are good because a good coating surface is obtained. When the Mw of the copolymer is not more than 2,500,000, the thickening action on liquid is appropriate and an effect of extending the coating liquid is obtained sufficiently, and the coating film has appropriate strength; therefore, inorganic filler existing in the coating substance is stably fixed, and also drying properties are good.

The ratio (Mw/Mn) between the weight-average molecular weight (Mw) and the number-average molecular weight (Mn), which is an index of the molecular weight distribution of the copolymer, is preferably not less than 1.8, more preferably not less than 2.0, and still more preferably not less than 2.2. When Mw/Mn is not less than 1.8, a sufficient extending effect is obtained, and therefore a wide range of shear rates at the time of coating can be coped with; thus, this is preferable.

By the copolymer having a unit derived from a N-vinyl carboxylic acid amide monomer, an article with high viscosity can be obtained even when the concentration of introduced monomers is as low as less than 15 mass %, as compared to the case where a monomer of a salt of an unsaturated carboxylic acid alone is polymerized in an aqueous solution. Part or all of the (co)polymer obtained when polymerization is performed while the monomer concentration is set high is turned to gel, and thus there may be a problem with the uniformity of the solution and it may be difficult to take the product out of the reaction apparatus easily. If gelation occurs, the product is difficult to uniformly dissolve in water again. Further, the viscosity and the molecular weight are increased excessively; hence, the product is unsuitable as a coating agent, and aggregability is strong and a satisfactory effect of extending the coating liquid, which is an important role at the time of coating, is not obtained. Thus, polymerization is performed preferably with a concentration of introduced monomers at which gelation is not caused.

In the polymerization operation, polymerization is performed preferably while stirring is performed.

As the stirring, a type in which components in the reaction system are mixed by using an apparatus having a motor, an axis shaft, and a stirring blade is more preferable, and a type in which the stirring rotation rate can be varied with the state of progress of the polymerization reaction is particularly preferable. For the shape of the stirring blade, there are for example turbine blades, paddle blades, propeller blades, anchor blades, and three sweptback wings. An appropriate one may be used in each case; an anchor blade is suitable in the case of a polymer with high viscosity, and three sweptback wings are suitable in the case of middle-to-low viscosity.

By performing stirring during the manufacturing of the copolymer of the present invention, a uniform copolymer with an appropriate molecular weight distribution is obtained; thus, this is preferable.

A polymerization method that keeps the temperature in the reaction system constant and that includes continuous stirring is preferable; the range of temperature is, although it depends on the kind of the polymerization initiator, preferably 30 to 80° C., more preferably 40 to 75° C., and still more preferably 50 to 70° C. By the in-system temperature being kept constant and set within this temperature range, a desired molecular weight ratio can be obtained constantly.

As the polymerization initiator used for polymerization of the copolymer of the present invention, those commonly used for radical polymerization of vinyl compounds may be used without limitations. Examples include redox-based polymerization initiators, azo compound-based polymerization initiators, and peroxide-based polymerization initiators.

For these, one kind may be used singly, or two or more kinds may be used in combination. According to circumstances, the molecular weight may be adjusted by using a chain transfer agent.

The redox-based polymerization initiator is not limited, but is preferably a combination of ammonium persulfate and sodium thiosulfate, sodium hydrogen thiosulfate, trimethylamine, or tetramethylethylenediamine, or a combination of t-butyl hydroperoxide and sodium thiosulfate or sodium hydrogen thiosulfate.

The peroxide-based polymerization initiator is not limited, but is preferably a persulfate of for example sodium, potassium, or ammonium, or an organic peroxide such as benzoyl peroxide, lauroyl peroxide, caproyl peroxide, t-butyl peroctoate, or diacetyl peroxide.

The azo compound-based polymerization initiator is not limited, but is preferably 2,2'-azobis(2-methylbutyronitrile), 2,2'-azobis(2,4-dimethylvaleronitrile), dimethyl 2,2'-azobis (isobutyrate), dimethyl 2,2'-azobis(2-methylbutyrate), dimethyl 2,2'-azobis(2,4-dimethylpentanoate), 2,2'-azobis(2-amidinopropane) dihydrochloride, 2,2'-azobis[2-(2-imidazolin-2-yl) propane] dihydrochloride, 2,2'-azobis[N-(2-carboxyethyl)-2-methylpropionamidine] n-hydrate, 2,2'-azobis[2-[N-(2-carboxyethyl) amidino]propane] n-hydrate, or dimethyl 2,2'-azobis(2-methylpropionate).

In a polymerization method using water as a solvent, among the polymerization initiators mentioned above, an azo compound-based polymerization initiator not containing a halogen (that is, a non-halogen azo-compound-based polymerization initiator) is preferably used taking into account the influence of halogen substance residues in the polymerized substance on coating agents or electronic devices, and heat resistance, particularly heat discoloration properties. Specifically, it is most preferable to use 2,2'-azobis[N-(carboxyethyl)-2-methylpropionamidine] tetrahydrate (product name: azo compound-based polymerization initiator, VA-057, manufactured by FUJIFILM Wako Pure Chemical Corporation).

In the case of an azo compound-based polymerization initiator, the amount of the radical polymerization initiator used is, relative to the sum total of all the monomers of 100 parts by mass, preferably not less than 0.05 parts by mass and not more than 2.0 parts by mass, more preferably not less than 0.1 parts by mass and not more than 0.8 parts by mass, and still more preferably not less than 0.4 parts by mass and not more than 0.7 parts by mass. In the case of a redox-based polymerization initiator, the amount of the radical polymerization initiator used is, relative to 100 parts by mass of all the monomers, preferably not less than 0.001 parts by mass and not more than 0.03 parts by mass, more preferably not less than 0.003 parts by mass and not more than 0.01 parts by mass, and still more preferably not less than 0.004 parts by mass and not more than 0.009 parts by mass. When the amount of the radical polymerization initiator used is within the range mentioned above, it is likely that both the rate of polymerization and the molecular weight of the copolymer will be appropriate.

A chain transfer agent may be used at the time of copolymerization for the purpose of regulating the degree of polymerization of the copolymer or for the purpose of introducing a modifying group to a terminal of the copolymer, to the extent that the object of the present invention is not impaired. As the chain transfer agent, aldehyde compounds such as acetaldehyde and propionaldehyde, ketone compounds such as acetone and methyl ethyl ketone, thiol compounds such as 2-hydroxyethanethiol, 3-mercaptopropionic acid, dodecanethiol, and thioacetic acid, halogenated hydrocarbon compounds such as carbon tetrachloride, trichloroethylene, and perchloroethylene, and phosphinates such as sodium phosphinate monohydrate are given. Among these, thiol compounds, aldehyde compounds, and ketone compounds are preferably used. The amount of the chain transfer agent added is preferably not less than 0.1 parts by mass and not more than 2.0 parts by mass relative to the sum total of all the monomers of 100 parts by mass. When the amount is within this range, for example the regulation of the degree of polymerization and the introduction of a modifying group to a terminal of the polymer are enabled.

Mixing may be performed during polymerization, or mixing may be performed after polymerization.

Water

The water is not particularly limited; for example distilled water, ion-exchanged water, and tap water may be used, but ion-exchanged water is preferable.

Composition for Aqueous Coating Liquid

A composition for aqueous coating liquid of the present invention is a composition in which at least a copolymer of a N-vinyl carboxylic acid amide and a salt of an unsaturated carboxylic acid are dissolved in a solvent containing at least water.

Water is used as the solvent, but the solvent may be a mixed solvent for example in which water and alcohols are mixed. In the case where alcohols are mixed, the alcohols are contained in the solvent preferably in an amount of less than 50 mass %. In terms of for example cost, manufacturing management, and waste disposal, it is preferable to use only water.

The sum of the mass of the N-vinyl carboxylic acid amide monomer and the mass of the monomer of a salt of an unsaturated carboxylic acid is, relative to the solvent, preferably not more than 20 parts by mass, and more preferably not more than 15 parts by mass. When the sum of the mass of the N-vinyl carboxylic acid amide monomer and the mass of the monomer of a salt of an unsaturated carboxylic acid is not more than the parts by mass mentioned above relative to the solvent, the copolymer is not turned to gel in the solvent, and a redissolution step is not needed; thus, this is preferable.

The composition for aqueous coating liquid of the present invention may contain a homopolymer in addition to the copolymer mentioned above. The homopolymer is preferably a homopolymer of a N-vinyl carboxylic acid amide such as N-vinylformamide, N-vinylacetamide, N-vinylpropionamide, N-vinylbenzamide, N-vinyl-N-methylformamide, N-vinyl-N-ethylformamide, N-vinyl-N-methylacetamide, N-vinyl-N-ethylacetamide, or N-vinylpyrrolidone, and particularly preferably a homopolymer of N-vinylacetamide.

The ratio between the copolymer and the homopolymer is, as the mass ratio of the solid content, preferably 3:97 to 97:3, more preferably 5:95 to 95:5, and still more preferably 7:93 to 93:7. When the ratio is within the range mentioned above, drying time can be kept; thus, this is preferable.

The composition for aqueous coating liquid of the present invention is preferably in a state where inorganic fillers are dispersed and made uniform up to the form of primary particles.

It is surmised that, compared to a homopolymer, a copolymer has weaker cohesive force of for example hydrogen bonds which are involved in hydrophilicity, and the copolymer is uniformly adsorbed on the surfaces of particles of inorganic filler, thus a dispersion effect is continued by repulsive force typified by the repellent force of the electric charge of the copolymer, and re-aggregation is less likely to occur even during drying, and the copolymer is uniformly distributed on the surfaces of porous particles, and that thereby unevenness of the heated state during drying is suppressed. It is presumed that consequently water is released easily and dryness is achieved easily.

Ratio Between the Copolymer and Water:

For the ratio between the copolymer and water, the copolymer accounts for preferably 1.0 to 20.0 parts by mass, more preferably 3.0 to 15.0 parts by mass, and still more preferably 5.0 to 12.0 parts by mass relative to 100 parts by mass of water. When the copolymer accounts for not more than 20.0 parts by mass relative to 100 parts by mass of water, the copolymer is obtained as an aqueous solution; thus, this is preferable.

Inorganic Filler:

Inorganic filler is preferably contained in the composition for aqueous coating liquid mentioned above in order to impart heat resistance to the dried substance of the composition for aqueous coating liquid. It is presumed that, by inorganic filler being contained in the composition for aqueous coating liquid, a state where the inorganic filler is dispersed and made uniform up to the form of primary particles is achieved.

The inorganic filler used is not particularly limited, and may be at least one selected from the group consisting of boron nitride, aluminum nitride, silicon carbide, silica, alumina (aluminum oxide), boehmite (a hydrate of aluminum oxide), talc, zinc oxide, titanium oxide, titanium black, and graphite. Among these, alumina and boehmite are preferable in terms of reinforcing properties for the coating base material, heat radiation properties, and easy availability for example.

Ratio Between the Copolymer and Inorganic Filler:

For the ratio between the copolymer and inorganic filler, the solid content of the copolymer is preferably 0.1 to 20.0 parts by mass, more preferably 0.5 to 10.0 parts by mass, and still more preferably 1.0 to 5.0 parts by mass relative to 100 parts by mass of inorganic filler. The solid content of the copolymer was found by multiplying the mass of the composition for aqueous coating liquid by the solid content concentration.

The method for mixing the copolymer and inorganic filler is not particularly limited, either; in terms of achieving a more uniform mixed state, it is preferable to dissolve the copolymer and other water-soluble materials in a solvent containing at least water, then add inorganic filler, and perform mixing. It is more preferable to, while continuously stirring an aqueous solution in which the copolymer and other water-soluble materials were dissolved, successively add the inorganic filler, and perform stirring mixing to uniformity. Thereby, an ideal mixed form can be taken.

The amount of inorganic filler contained is, relative to the total mass of the composition, within the range of preferably not more than 70 mass %, more preferably 20 to 60 mass %, and still more preferably 30 to 55 mass %. When the amount is within this range, an effect can be exhibited for promotion of drying of the composition.

Ratio Between Inorganic Filler and Water:

For the ratio between inorganic filler and water, inorganic filler accounts for preferably 10.0 to 300.0 parts by mass, more preferably 30.0 to 200.0 parts by mass, and still more preferably 50.0 to 100.0 parts by mass relative to 100 parts by mass of water. When the ratio is within this range, good fluidity of the composition for aqueous coating liquid is obtained; thus, this is preferable.

An aqueous high polymer coating substance according to the present invention is manufactured by applying the composition for aqueous coating liquid mentioned above to a surface of a base material and performing drying.

In other words, the composition in the present invention that contains a copolymer containing a N-vinyl carboxylic acid amide and a salt of an unsaturated carboxylic acid, and at least water can provide a coating and drying method that significantly shortens the drying time as compared to a composition that contains a copolymer containing not both a N-vinyl carboxylic acid amide and a salt of an unsaturated carboxylic acid.

The method for applying the composition to a base material is not particularly limited; spray coating, roll coating, bar coating, gravure coating, die coating, knife coating, inkjet coating, brush application, and dip coating, may be used for example, and furthermore coating may be performed in a continuous manner by using a roll-to-roll pattern applying apparatus.

The composition may also be a composition containing a known material that is added to the coating material in addition to the materials mentioned above; for example, may contain an emulsion-based binder, a thixotropic agent, a dispersant, a surface conditioner, an antifoaming agent, or a leveling agent.

As the base material, films, nonwoven fabrics, porous bodies, and plate-like bodies for example may be used without particular limitations.

As the material that forms the base material, organic resin materials such as homopolypropylene, a copolymer of propylene and another olefin, polyethylene terephthalate, polyethylene naphthalate, polyamide ether ketone, polyimides, polyamides, polyphenylenesulfone, polyphenylene ether, polyethylene, polyether sulfone, polyether ether ketone, polybenzimidazole, polyether imide, polyamide-imides, poly(p-phenylene-2,6-benzobisoxazole), fluorine resins, and epoxy resins, metal materials such as aluminum, copper, silver, and iron, and inorganic materials such as glass (silicon oxide), alumina, magnesia, aluminum nitride, aluminum carbide, silicon nitride, and barium titanate are given. For the base material, one kind may be used singly, or two or more kinds may be used in combination.

The drying method is not particularly limited, and for example spin drying, vacuum drying, warm air drying, and infrared drying are given.

The drying time is not particularly limited, either; by the present invention, the drying time, in terms of the 95-mass % drying time described later, can be shortened to 1/3 to 1/10 of the drying time of drying that is performed when a polymer of N-vinylacetamide alone is used.

EXAMPLES

Hereinbelow, the present invention is described by using Examples; but the present invention is not construed as being limited to these at all.

<Viscosity>

The composition for aqueous coating liquid is diluted with ion-exchanged water in such a manner that the solid content concentration of the composition is 5.0 mass %, the solution is put into a 500-ml tall beaker and is allowed to stand still in a constant temperature bath at 20° C. for 12 hours or more, and a state where there are completely no internal air bubbles is created. After that, the beaker is put into a constant temperature water bath adjusted to a temperature of 20° C., and a thermometer is used to check that the temperature of the test object is 20±0.5° C.; the viscosity is measured under the following conditions by using a Brookfield viscometer shown in JIS K-7117-1-1999. The viscosity 10 minutes after the specimen is placed on the viscometer is recorded.

Rotation rate: 50 rpm
Temperature: 20° C.

In the Case of not Less than 5,000 mPa·s
Viscometer: a DVE (Brookfield) viscometer, the HA type
Spindle: a No. 6 spindle In the Case of Less than 5,000 mPa·s
Viscometer: a DVE (Brookfield) viscometer, the LV type
Spindle: a No. 4 spindle <Solid Content Concentration>

An approximately 3.0 g sample of a composition for aqueous coating liquid was collected, was put in an aluminum cup (base area: 22 cm$^2$), was spread with a spoon flatly and uniformly on the bottom of the aluminum cup, and was heated and dried at 140° C. for 90 minutes with a thermobalance (PM460, manufactured by Mettler Toledo K.K.); the mass after cooling was measured, and the solid content concentration was measured by the following formula.

Solid content concentration(mass %)=100×($M3$−$M1$)+($M2$−$M1$)

M1: The mass of the aluminum cup (g)
M2: The mass of the specimen before drying+the mass of the aluminum cup (g)
M3: The mass of the specimen after drying+the mass of the aluminum cup (g)

<Measurement of the Absolute Molecular Weights of Standard Polymers for Preparing GPC Calibration Curves>

The N-vinylacetamide polymer, the N-vinylacetamide-sodium acrylate copolymer, and the sodium acrylate polymer having each predetermined molecular weight regions were dissolved in an eluent and allowed to stand for 20 hours. The solid content concentration in this solution is 0.05 mass %.

The solution was filtered with a 0.45-μm membrane filter, and the filtrate was subjected to GPC-MALS (a multiangle light scattering detector) to measure the absolute molecular weight of the peak position.

GPC: Shodex (registered trademark) SYSTEM 21, manufactured by Showa Denko K.K.
Column: Shodex (registered trademark) LB-80, manufactured by Showa Denko K.K.
Column temperature: 40° C.
Eluent: 0.1 mol/L NaH$_2$PO$_4$+0.1 mol/L Na$_2$HPO$_4$
Flow velocity: 0.64 mL/min
Amount of the specimen injected: 100 μL
MALS detector: DAWN (registered trademark) DSP, manufactured by Wyatt Technology Corporation
Laser wavelength: 633 nm
Multiangle fitting method: The Berry method <Mw/Mn>

The composition for aqueous coating liquid was diluted with distilled water in such a manner that the solid content concentration was 0.1 mass %, the weight-average molecular weight Mw and the number-average molecular weight Mn were measured by the GPC (gel permeation chromatography) method under the following conditions, and the ratio between them was calculated.

The weight-average molecular weight and the number-average molecular weight in the present measurement were obtained by using a calibration curve prepared from the results of measurement of the absolute molecular weights of each set of N-vinylacetamide polymers, N-vinylacetamide-sodium acrylate copolymers, and sodium acrylate polymers of having predetermined molecular weight regions using the multiangle light scattering detector described above.

Detector (RI): SHODEX (registered trademark) RI-201H, manufactured by Showa Denko K.K.
Pump: LC-20AD, manufactured by Shimadzu Corporation
Column oven: SHODEX (registered trademark) AO-30C, manufactured by Showa Denko K.K.
Analysis apparatus: SIC 48011 Data Station, manufactured by System Instruments Co., Ltd.
Column: SHODEX (registered trademark) SB806 (2 columns), manufactured by Showa Denko K.K.
Eluent: Distilled water/2-propanol=8/2 (mass ratio)
Flow rate: 0.7 ml/min <Measurement of Remaining Monomers>

The composition for aqueous coating liquid was dissolved in a sodium sulfate (Na$_2$SO$_4$) aqueous solution with a concentration of 0.05 mol/L, and a solution with a solid content concentration of 0.01 mass % was obtained. Then, this solution was analyzed by the GPC method, and the total amount of various monomers remaining in the polymer specimen (the amount of remaining monomers) was calculated. Whether polymerization reaction is completed or not can be checked by using this amount of remaining monomers.

Detector (RI): SHODEX (registered trademark) RI-61, manufactured by Showa Denko K.K.
Pump: SHODEX (registered trademark) DS-4, manufactured by Showa Denko K.K.
Column oven: U-620, 40° C., manufactured by Sugai
Analysis apparatus: C-R7A Plus, manufactured by Shimadzu Corporation
Column: SHODEX (registered trademark) SB802.5HQ (1 column), manufactured by Showa Denko K.K.
Eluent: A 0.5-mol/L Na$_2$SO$_4$ aqueous solution; Flow rate: 1.0 ml/min The concentration was found by a working curve method (sample concentration: 1, 5, 10, and 100 mass ppm).

<95-Mass % Evaporation Time>

The composition for aqueous coating liquid was adjusted with ion-exchanged water in such a manner that the solid content concentration was 5.0 mass %. 1.5 g of the composition for aqueous coating liquid is collected and put in an aluminum cup (base area: 22 cm$^2$), and is spread with a spoon flatly and uniformly on the bottom surface of the aluminum cup.

Using a thermobalance (PM460, manufactured by Mettler Toledo K.K.), the evaporation time taken for a 95 mass % decrease from the initial mass at 85° C., that is, taken until water is almost evaporated, is measured at intervals of 1 minute.

The following assessment criteria were employed on the basis of the time taken for a 95 mass % decrease from the initial mass.

A: Not more than 40 minutes
B: More than 40 minutes and not more than 45 minutes
C: More than 45 minutes and not more than 50 minutes
D: More than 50 minutes <59-Mass % Evaporation Time>

Inorganic Filler Mixing (Preparation of an Inorganic Filler-Containing Composition for Aqueous Coating Liquid)

20 g of a composition for aqueous coating liquid that was adjusted with ion-exchanged water in such a manner that the solid content concentration was 5 mass % was put into a 200-ml polyethylene container for a planetary kneader, subsequently 40 g of alumina (AL-160SG, manufactured by Showa Denko K.K.) and 40 g of ion-exchanged water were put in, and the container was stoppered tightly.

A planetary kneader (ARE-250, manufactured by Thinky Corporation) was used to perform mixing under the conditions of 60 seconds of mixing and 60 seconds of defoaming.

The resulting slurry solution was put into a 100-ml polypropylene container equipped with a tight stopper, and was allowed to stand still for 6 hours or more in a 20° C. constant temperature bath; thus, an inorganic filler-containing composition for aqueous coating liquid was obtained.

1.5 g of the inorganic filler-containing composition for aqueous coating liquid is collected, is put in an aluminum cup (base area: 22 cm$^2$), and is spread with a spoon flatly and uniformly on the bottom surface of the aluminum cup.

Using a thermobalance (PM460, manufactured by Mettler Toledo K.K.), the evaporation time taken for a 59 mass % decrease from the initial mass at 85° C., that is, taken until water is almost evaporated, is measured at intervals of 1 minute.

The following assessment criteria were employed on the basis of the time taken for a 59 mass % decrease from the initial mass for the inorganic filler-containing composition for aqueous coating liquid.

A: Not more than 20 minutes
B: More than 20 minutes and not more than 25 minutes
C: More than 25 minutes and not more than 30 minutes
D: More than 30 minutes <Evaluation of Coating Properties>

5 g of the composition for aqueous coating liquid or the inorganic filler-containing composition for aqueous coating liquid obtained was put on a polypropylene sheet (width: 100 mm×length: 300 mm×thickness: 30 μm) that was fixed with double-sided adhesive tape to a coating base of a coating machine, and was applied 300 mm long at a speed of 400 mm/second by using an automatic coating machine (Pi-1210, manufactured by Tester Sangyo Co., Ltd.) using a bar coater (manufactured by Yoshimitsu Seiki K.K., width: 70 mm×thickness: 50 μm).

The evaluation was performed by the following criteria.
Good: A coating surface that is uniform as a whole is obtained.
Average: Although no conspicuous aggregates are seen for example, there are scratchy parts or 3-mm-or-less diameter pinholes in 10% or less of the area of the coating surface.
Poor: A large number of aggregates with diameters of 3 mm or more are seen in 10% or more of the area of the coating surface, and coating could not be done in 10% or more of the coating surface.

<Evaluation of Covering Film Properties>

30 g of the composition for aqueous coating liquid or the inorganic filler-containing composition for aqueous coating liquid that had been diluted with ion-exchanged water to a solid content concentration of 5 mass % is extended into a flat state in a polypropylene vat (long-side length: 25 cm×short-side length: 14 cm×height: 4 cm), and is dried for 24 hours at a temperature of 50° C. with an air oven.

The state of the dried film was evaluated by the following criteria.

The evaluation was performed by the following criteria.
Good: A film in a uniform state is obtained.
Average: A film in which some holes or breaks are seen is obtained.
Poor: Film could not be made and fragments are produced, or a flat, uniform film is not obtained.

<Yellowness Index>

The composition was diluted with ion-exchanged water in such a manner that the copolymer concentration was 5.0 mass %, 100 g of the copolymer aqueous solution was put into a 150-ml capacity glass bottle equipped with a tight stopper, and the bottle was stoppered tightly and was exposed at 98° C. for 72 hours with an air oven.

After leaving this to cool to room temperature, the yellowness index of the copolymer aqueous solution after the exposure was measured with a colorimeter/color difference meter (ZE6000, manufactured by Nippon Denshoku Industries Co., Ltd.) in conformity with the reflection method of JIS K-7373-2006.

Example 1

A nitrogen gas introduction tube, a stirring machine, and a thermometer were attached to a four-neck 1-L separable flask, and 800 g of ion-exchanged water was introduced into the separable flask. Subsequently, an aqueous solution in which 10 g of N-vinylacetamide (manufactured by Showa Denko K.K.) and 90 g of sodium acrylate (manufactured by Showa Denko K.K.) were dissolved in 90 g of ion-exchanged water (subjected to nitrogen gas deaeration treatment for 2 days in advance) was introduced into the separable flask. Stirring and warming were performed while nitrogen gas deaeration treatment into the solution was performed, and the temperature was increased with a warm bath in such a manner that the internal temperature was 68° C.; after a lapse of 2 hours, an aqueous solution in which 1.0 g of 2,2'-azobis[N-(carboxyethyl)-2-methylpropionamidine] tetrahydrate of a polymerization initiator (hereinafter, VA-057) (the total ratio of monomers: 1.0 part by mass) was dissolved in 9 g of ion-exchanged water that had undergone nitrogen gas deaeration treatment, was added with a syringe. The internal temperature was set to 68° C., an anchor blade was attached to a Three-One Motor (registered trademark) (a high power general-purpose stirring machine, BLh600, manufactured by Shinto Scientific Co., Ltd.), polymerization was performed while stirring was performed at 75 rpm for 4 hours, and then the internal temperature was increased to 75° C.; after a lapse of 1 hour, it was checked that the sum of the concentrations of N-vinylacetamide monomers and sodium acrylate monomers was 1000 mass ppm or less, and ice cooling was performed to end the reaction; thus, a composition for aqueous coating liquid was obtained.

The weight-average molecular weight of the obtained N-vinylacetamide copolymer was 1,170,000. The viscosity of an aqueous solution obtained by performing dilution with 1000 g of ion-exchanged water (subjected to nitrogen gas bubbling for 2 days in advance) in such a manner that the solid content concentration was 5 mass % was 28,000 mPa·s.

Example 2

A nitrogen gas introduction tube, a stirring machine, a solvent dropping apparatus, and a thermometer were attached to a four-neck 1-L separable flask, 500 g of ion-exchanged water (subjected to nitrogen gas deaeration treatment for 2 days in advance) was introduced into the separable flask, an anchor blade was attached to a Three-One Motor (a high power general-purpose stirring machine, BLh600, manufactured by Shinto Scientific Co., Ltd.) and stirring was performed at 75 rpm while nitrogen gas deaeration treatment into the solution was performed, and heating was performed with a warm bath to an internal temperature of 68° C.; 2 hours later, 0.5 g of VA-057 of a polymerization initiator (the total ratio of monomers: 0.5 mass %) was dissolved in 9.5 g of ion-exchanged water that had undergone nitrogen gas deaeration treatment, and the solution was added with a syringe. 5 minutes later, an aqueous solution of which 50 g of N-vinylacetamide monomers (manufactured by Showa Denko K.K.) and 50 g of sodium acrylate monomers (manufactured by Showa Denko K.K.) were dissolved in 50 g of ion-exchanged water that had undergone nitrogen gas deaeration treatment, and 340 g of ion-exchanged water that had undergone nitrogen gas deaeration treatment were mixed, and the resultant aqueous solution was introduced by dropping for 2 hours with a pump. After the dropping was ended, the temperature of 68° C. was held for 2 hours, then the internal temperature was increased to 75° C. and held for 1 hour, then it was checked that the sum of the concentrations of N-vinylacetamide monomers and sodium acrylate monomers was 1,000 mass ppm or less, and ice cooling was performed to end the reaction; thus, a composition for aqueous coating liquid was obtained.

Examples 3 to 5 and Comparative Examples 1, 3, 4, 7, and 8

Procedures were performed similarly to Example 1 except that the reagents, the introduction amounts, the reaction times, and the reaction temperatures described in Table 1 were used.

Example 6

10 g of the composition for aqueous coating liquid manufactured in Example 1 and 90 g of the composition for aqueous coating liquid manufactured in Comparative Example 1 were put into a 200-ml separable flask, an anchor blade was attached to a Three-One motor (a high power general-purpose stirring machine, BLh600, manufactured by Shinto Scientific Co., Ltd.), and mixing was performed at 20° C. and 150 rpm for 60 minutes.

The mixed copolymer was taken out of the separable flask, was put into a 100-ml polypropylene container equipped with a tight stopper, and was allowed to stand still in a constant temperature bath at 20° C. for 6 hours; thus, a composition for aqueous coating liquid was obtained.

Examples 7 and 8

Procedures were performed similarly to Example 6 except that the introduction amounts described in Table 2 were used.

Comparative Example 2

A procedure was performed similarly to Example 2 except that the reagents and the introduction amounts described in Table 1 were used.

Comparative Example 5

90 g of N-vinylacetamide and 35.1 g of an aqueous solution with a sodium acrylate content of 28.5 mass % were introduced into a four-neck 1-L separable flask equipped with a nitrogen gas introduction tube and a thermometer, and 255 g of ion-exchanged water was introduced. Subsequently, in this state, ice cooling was performed with a water bath to 10° C. while nitrogen gas deaeration treatment was performed in the solution. At the point in time when 2 hours elapsed from the start of substitution with nitrogen gas, 20 g of ion-exchanged water in which VA-057 of a polymerization initiator was dissolved at 0.2 mass % was introduced, and the flask was taken out of the water bath and was surrounded with a heat insulator to be insulated from heat.

This was left to progress naturally and left until reaching the peak temperature of polymerization temperature, where polymerization was performed for 6 hours. The polymerization peak temperature at this time was 75° C., and the temperature at the time of the end was 35° C.

The polymerized agar-like gel was taken out of the separable flask, and was cut, dried, and pulverized to obtain a powder copolymer. The concentration of remaining monomers was found for the obtained powder copolymer. The solid content concentration of the powder copolymer was 99.5 mass %. The powder copolymer was dissolved in ion-exchanged water, and a composition for aqueous coating liquid with a solid content concentration of 5.0 mass % was obtained.

Comparative Example 6

10 g of N-vinylacetamide and 315.8 g of an aqueous solution with a sodium acrylate content of 28.5 mass % were introduced into a four-neck 1-L separable flask equipped with a nitrogen gas introduction tube and a thermometer, and 9.0 g of ion-exchanged water was introduced. Subsequently, in this state, the internal temperature was held at 30° C. while substitution with nitrogen gas was performed in the solution. At the point in time when 2 hours or more elapsed from the start of substitution with nitrogen, 0.2 g of VA-057 of a polymerization initiator, 0.05 g of ammonium peroxodisulfate, and 9.75 g of ion-exchanged water were introduced and polymerization was started, and the flask was surrounded with a heat insulator to be insulated from heat. When 4 hours elapsed from the start of polymerization, it was checked that the polymerization peak temperature was 80° C., and then cooling was performed to room temperature; the polymerized agar-like gel was taken out of the separable flask, and was cut, dried, and pulverized to obtain a powder copolymer. The concentration of remaining monomers was found for the obtained powder copolymer. The solid content concentration of the powder copolymer was 99.4 mass %. The powder copolymer was dissolved in ion-exchanged water, and a composition for aqueous coating liquid with a solid content concentration of 5.0 mass % was obtained.

TABLE 1

|   |   | Example 1 | Example 2 | Example 3 | Example 4 | Example 5 | Comparative Example 1 |
|---|---|---|---|---|---|---|---|
| Method |   | Bulk | Dropping | Bulk | Bulk | Bulk | Bulk |
| Introduced substance | Ion-exchanged water (g) | 800 | 500 | 895 | 800 | 800 | 890 |
|   | N-vinylacetamide (g) | 10 | 50 | 5 | 10 | 10 | 100 |

TABLE 1-continued

|  |  |  |  |  |  |  |  |
|---|---|---|---|---|---|---|---|
|  | Sodium acrylate (g) | 90 | 50 | 45 | 90 | 90 |  |
|  | Ion-exchanged water for sodium acrylate to be dissolved in (g) | 90 | 50 | 45 | 90 | 90 |  |
|  | Ion-exchanged water (g) |  | 340 |  |  |  |  |
|  | NVA/AANa (molar ratio) | 10.9:89.1 | 52.5:47.5 | 10.9:89.1 | 10.9:89.1 | 10.9:89.1 | 100:0 |
| Conditions 1 | Temperature (° C.) | 68 | 68 | 56 | 68 | 68 | 56 |
|  | Time (h) | 2. | 2. | 2. | 2. | 2. | 2. |
| Polymerization initiator | VA-057 (g) | 1.0 | 0.5 | 0.3 |  |  | 0.05 |
|  | V-50 (g) |  |  |  | 1.0 |  |  |
|  | VA-044 (g) |  |  |  |  | 1.0 |  |
|  | Ammonium peroxodisulfate (g) |  |  |  |  |  |  |
|  | Aqueous solution for polymerization initiator to be dissolved in (g) | 9. | 9.5 | 9.7 | 9. | 9. | 9.95 |
| Conditions 2 | Temperature (° C.) | 68 | 68 | 56 | 68 | 68 | 56 |
|  | Time (h) | 4.0 | 2.0 (Dropping) | 4.0 | 4.0 | 4.0 | 4.0 |
| Conditions 3 | Temperature (° C.) | 75 | 75 | 75 | 75 | 75 | 75 |
|  | Time (h) | 1.0 | 1.0 | 1.0 | 1.0 | 1.0 | 1.0 |
| Property evaluation | Viscosity of 5-mass % solid content aqueous solution (mPa · s) | 28000 | 1850 | 14500 | 28000 | 1850 | 28800 |
|  | Solid content concentration (mass %) | 10.1 | 10.1 | 5.2 | 10.1 | 10.1 | 10.2 |
|  | Copolymer per 100 parts by mass of water (parts by mass) | 11.2 | 11.2 | 5.5 | 11.2 | 11.2 | 11.3 |
|  | Weight-average molecular weight Mw | $117 \times 10^4$ | $18 \times 10^4$ | $224 \times 10^4$ | $117 \times 10^4$ | $18 \times 10^4$ | $120 \times 10^4$ |
|  | Weight-average molecular weight Mw/number-average molecular weight Mn | 2.45 | 3.07 | 2.11 | 2.58 | 3.24 | 2.74 |
|  | Remaining monomers (mass ppm) (total) | 550 | 380 | 460 | 550 | 380 | 650 |
|  | 95-mass % evaporation time (min) | 35 | 33 | 30 | 35 | 33 | 55 |
|  | Assessment of 95-mass % evaporation time | A | A | A | A | A | D |
|  | Covering film properties | Good | Good | Good | Good | Good | Good |
|  | Coating properties | Good | Good | Good | Good | Good | Good |
|  | Yellowness index | 0.21 | 0.23 | 0.18 | 12.5 | 13.8 | 0.53 |
|  | 59-mass % evaporation time in case of inorganic filler mixing (min) | 18 | 19 | 20 |  |  | 28 |
|  | Assessment of 59-mass % evaporation time in case of inorganic filler mixing | A | A | A |  |  | C |

TABLE 1-continued

|  |  | | | |  | | |
|---|---|---|---|---|---|---|---|
| Covering film properties in case of inorganic filler mixing | Good | Good | Good | | | Good | |
| Coating properties in case of inorganic filler mixing | Good | Good | Good | | | Good | |

|  |  | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Method | | Dropping | Bulk | Bulk | Bulk | Bulk | Bulk | Bulk |
| Introduced substance | Ion-exchanged water (g) | 500 | 940 | 890 | 255 | | 800 | 890 |
| | N-vinylacetamide (g) | 100 | 50 | | 90 | 10 | 5 | 95 |
| | Sodium acrylate (g) | | | 50 | 10 | 90 | 95 | 5 |
| | Ion-exchanged water for sodium acrylate to be dissolved in (g) | | | 50 | 25 | 225.8 | 95 | 5 |
| | Ion-exchanged water (g) | 400 | | | | | | |
| | NVA/AANa (molar ratio) | 100:0 | 100:0 | 0:100 | 90.9:9.1 | 10.9:89.1 | 5.5:94.5 | 95.5:4.5 |
| Conditions 1 | Temperature (° C.) | 68 | 56 | 56 | 10 | 30 | 56 | 56 |
| | Time (h) | 2. | 2. | 2. | 2. | 2. | 2. | 2. |
| Polymerization initiator | VA-057 (g) | 0.5 | 0.2 | 0.1 | 0.04 | 0.2 | 0.6 | 0.6 |
| | V-50 (g) | | | | | | | |
| | VA-044 (g) | | | | | | | |
| | Ammonium peroxodisulfate (g) | | | | | 0.05 | | |
| | Aqueous solution for polymerization initiator to be dissolved in (g) | 9.5 | 9.8 | 9.9 | 19.96 | 9.75 | 4.4 | 4.4 |
| Conditions 2 | Temperature (° C.) | 68 | 56 | 56 | (Natural progress) | (Heat insulation) | 56 | 56 |
| | Time (h) | 2.0 (Dropping) | 4.0 | 4.0 | 6.0 | 4.0 | 4.0 | 4.0 |
| Conditions 3 | Temperature (° C.) | 75 | 75 | 75 | | | 75 | 75 |
| | Time (h) | 1.0 | 1.0 | 1.0 | | | 1.0 | 1.0 |
| Property evaluation | Viscosity of 5-mass % solid content aqueous solution (mPa · s) | 1750 | 14200 | 100 | 160000 | 230000 | 19800 | 15000 |
| | Solid content concentration (mass %) | 10.2 | 5.1 | 12.5 | 5.0 | 5.0 | 10.1 | 10.1 |
| | Copolymer per 100 parts by mass of water (parts by mass) | 11.3 | 5.4 | 14.3 | 5.3 | 5.3 | 11.2 | 11.2 |
| | Weight-average molecular weight Mw | $16 \times 10^4$ | $232 \times 10^4$ | $7 \times 10^4$ | $282 \times 10^4$ | $348 \times 10^4$ | $97 \times 10^4$ | $83 \times 10^4$ |
| | Weight-average molecular weight Mw/number-average molecular weight Mn | 1.97 | 2.14 | 2.57 | 1.19 | 1.28 | 2.87 | 3.21 |
| | Remaining monomers (mass ppm) (total) | 580 | 520 | 200 | 550 | 450 | 450 | 570 |
| | 95-mass % evaporation time (min) | 57 | 55 | 56 | 58 | 57 | 58 | 59 |

TABLE 1-continued

| | | | | | | | |
|---|---|---|---|---|---|---|---|
| Assessment of 95-mass % evaporation time | D | D | D | D | D | D | D |
| Covering film properties | Good | Good | Poor | Poor | Poor | Good | Good |
| Coating properties | Good | Good | Poor | Poor | Poor | Good | Good |
| Yellowness index | 0.23 | 0.31 | 0.33 | 0.34 | 0.28 | 0.78 | 0.55 |
| 59-mass % evaporation time in case of inorganic filler mixing (min) | | | 35 | 32 | | 30 | |
| Assessment of 59-mass % evaporation time in case of inorganic filler mixing | | | D | D | | C | |
| Covering film properties in case of inorganic filler mixing | | | Poor | Good | | Good | |
| Coating properties in case of inorganic filler mixing | | | Poor | Poor | | Good | |

V-50: 2,2'-Azobis(2-amidinopropane) dihydrochloride, manufactured by FUJIFILM Wako Pure Chemical Corporation VA-044: 2,2'-Azobis[2-(2-imidazolin-2-yl)propane] dihydrochloride, manufactured by FUJIFILM Wako Pure Chemical Corporation

TABLE 2

| | Example 6 | Example 7 | Example 8 | (Re-post) Example 1 | (Re-post) Comparative Example 1 |
|---|---|---|---|---|---|
| Mixing ratio of Example 1:Comparative Example 1 (mass ratio) | 10:90 | 50:50 | 90:10 | 100:0 | 0:100 |
| 95-mass % evaporation time (min) | 37 | 39 | 38 | 35 | 55 |
| Assessment of 95-mass % evaporation time | A | A | A | A | D |
| Covering film properties | Good | Good | Good | Good | Good |
| Coating properties | Good | Good | Good | Good | Good |

The compositions for aqueous coating liquid shown in Examples 1 to 5, each of which contains a copolymer obtained by copolymerizing a monomer of a salt of an unsaturated carboxylic acid with a N-vinyl carboxylic acid amide monomer, show shorter periods of evaporation time than the compositions for aqueous coating liquid shown in Comparative Examples 1 to 3, each of which contains a homopolymer of a N-vinyl carboxylic acid amide monomer.

Further, the compositions for aqueous coating liquid shown in Examples 6 to 8, each of which contains a mixture of a homopolymer of a N-vinyl carboxylic acid amide monomer and a copolymer of a N-vinyl carboxylic acid amide monomer and a monomer of a salt of an unsaturated carboxylic acid, show shorter periods of evaporation time than a composition for aqueous coating liquid containing a homopolymer of a N-vinyl carboxylic acid amide monomer.

Furthermore, the excellent covering film properties and the excellent coating properties of the composition for aqueous coating liquid containing a homopolymer of a N-vinylacetamide monomer shown in Comparative Example 1 are maintained even in the compositions for aqueous coating liquid each containing a monomer of a salt of an unsaturated carboxylic acid in addition to a N-vinyl carboxylic acid amide monomer (shown in Examples 1 to 8).

Comparative Example 4, which is a composition for aqueous coating liquid containing a homopolymerization article of a monomer of a salt of an unsaturated carboxylic acid, has a lower viscosity than Examples 1 to 3 and has a low molecular weight, and is poor in drying properties, covering film properties, and coating properties.

For the static polymerization articles of Comparative Example 5 and Comparative Example 6, the molecular weight is high, and the composition for aqueous coating liquid containing the static polymerization article is poor in coating properties and drying properties.

Furthermore, for the evaluation concerning blending of inorganic filler, Examples 1 to 3 are excellent in drying time, covering film properties, and coating properties as compared to Comparative Examples 1, 4, 5, and 7, even in the state where inorganic filler was blended.

Further, as shown in Comparative Examples 7 and 8, the composition for aqueous coating liquid containing a copolymer obtained by polymerization that was performed while the molar ratio between N-vinyl carboxylic acid amide monomers and monomers of the salt of an unsaturated carboxylic acid mentioned above was set outside the range of 7.0:93.0 to 93.0:7.0, shows a longer period of evaporation time than in Examples 1 to 5.

The invention claimed is:

1. A composition for aqueous coating liquid, comprising at least:
    a copolymer of a N-vinyl carboxylic acid amide monomer and a monomer of a salt of an unsaturated carboxylic acid; and
    water,
    wherein a molar ratio between the N-vinyl carboxylic acid amide monomer and the monomer of a salt of an unsaturated carboxylic acid is 8.0:92.0 to 60.0:40.0, and a weight-average molecular weight of the copolymer is 100,000 to 1,500,000, and
    wherein Mw/Mn of the copolymer is not less than 2.2.

2. The composition for aqueous coating liquid according to claim 1, further comprising inorganic filler.

3. The composition for aqueous coating liquid according to claim 1, wherein
    the N-vinyl carboxylic acid amide monomer is N-vinylacetamide.

4. The composition for aqueous coating liquid according to claim 1, wherein
    a viscosity of an aqueous solution with a solid content concentration of the copolymer of 5 mass % is 1,500 to 30,000 mPa·s, and a solid content concentration is 1 to 15 mass %.

5. The composition for aqueous coating liquid according to claim 1, wherein
    the monomer of a salt of an unsaturated carboxylic acid is a salt of (meth)acrylic acid.

6. The composition for aqueous coating liquid according to claim 1, wherein
    the composition for aqueous coating liquid contains the copolymer at 1.0 to 20.0 parts by mass relative to 100 parts by mass of the water.

7. The composition for aqueous coating liquid according to claim 2, wherein
    the inorganic filler is at least one of alumina and boehmite.

8. The composition for aqueous coating liquid according to claim 1, wherein
    the composition for aqueous coating liquid further comprises a N-vinyl carboxylic acid amide homopolymer in addition to the copolymer of a N-vinyl carboxylic acid amide monomer and a monomer of a salt of an unsaturated carboxylic acid.

9. A method for manufacturing a water-soluble high polymer coating substance, the method comprising:
    applying the composition for aqueous coating liquid according to claim 1 to a surface of a base material; and
    performing drying.

10. A method for manufacturing the composition for aqueous coating liquid according to claim 1, the method comprising:
    performing radical polymerization by using a non-halogen azo-compound-based polymerization initiator.

11. A method for manufacturing the composition for aqueous coating liquid according to claim 1, the method comprising:
    performing polymerization by stirring polymerization.

12. The composition for aqueous coating liquid according to claim 2, wherein
    the N-vinyl carboxylic acid amide monomer is N-vinylacetamide.

13. The composition for aqueous coating liquid according to claim 2, wherein
    a viscosity of an aqueous solution with a solid content concentration of the copolymer of 5 mass % is 1,500 to 30,000 mPa·s, and a solid content concentration is 1 to 15 mass %.

14. The composition for aqueous coating liquid according to claim 2, wherein
    the monomer of a salt of an unsaturated carboxylic acid is a salt of (meth)acrylic acid.

15. The composition for aqueous coating liquid according to claim 2, wherein
    the composition for aqueous coating liquid contains the copolymer at 1.0 to 20.0 parts by mass relative to 100 parts by mass of the water.

16. The composition for aqueous coating liquid according to claim 2, wherein
    the composition for aqueous coating liquid further comprises a N-vinyl carboxylic acid amide homopolymer in addition to the copolymer of a N-vinyl carboxylic acid amide monomer and a monomer of a salt of an unsaturated carboxylic acid.

17. A method for manufacturing a water-soluble high polymer coating substance, the method comprising:
    applying the composition for aqueous coating liquid according to claim 2 to a surface of a base material; and
    performing drying.

18. A method for manufacturing the composition for aqueous coating liquid according to claim 2, the method comprising:
    performing radical polymerization by using a non-halogen azo-compound-based polymerization initiator.

19. A method for manufacturing the composition for aqueous coating liquid according to claim 2, the method comprising:
    performing polymerization by stirring polymerization.

* * * * *